Dec. 9, 1958     W. C. TRAUTMAN     2,863,968
KNOB AND SHAFT ASSEMBLY
Filed June 8, 1956
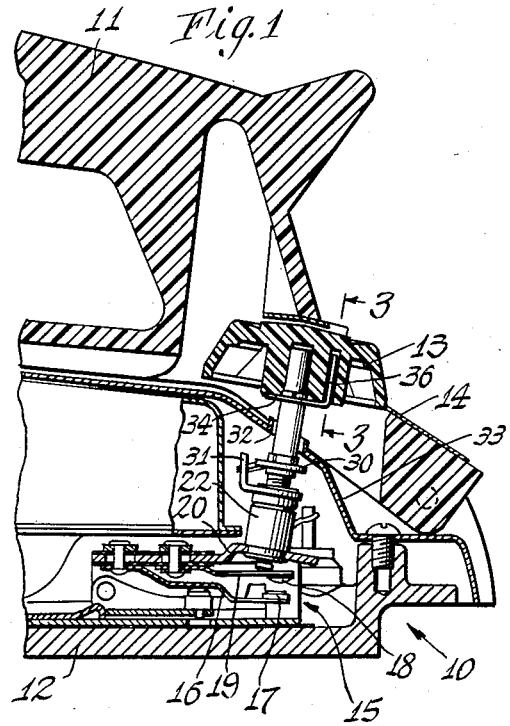
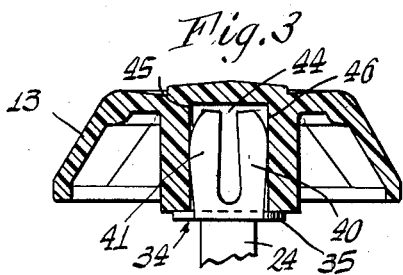
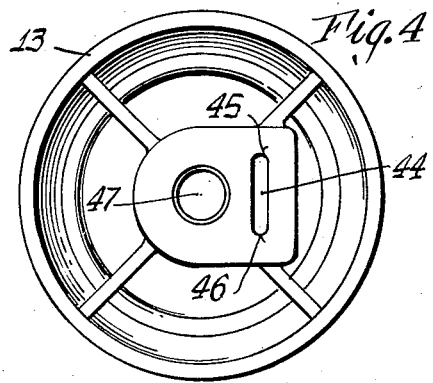
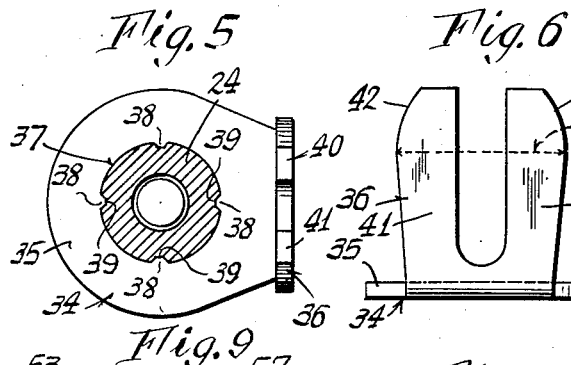
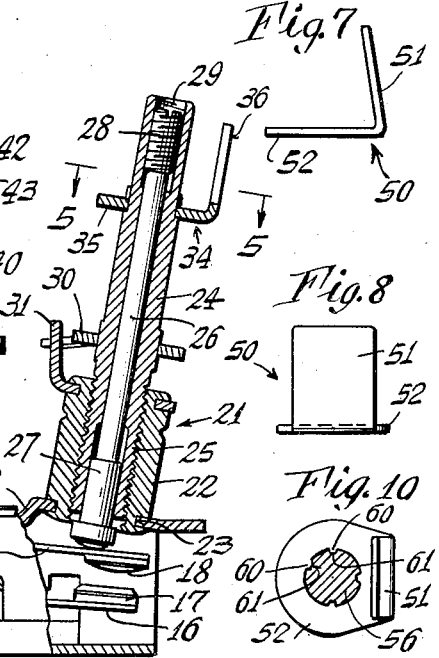
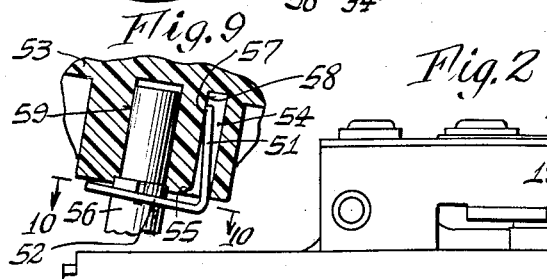
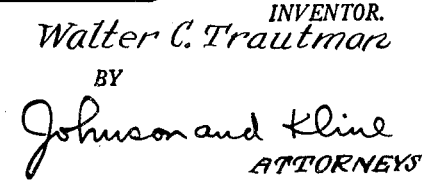
INVENTOR.
Walter C. Trautman
BY
Johnson and Kline
ATTORNEYS United States Patent Office 2,863,968
Patented Dec. 9, 1958

2,863,968

KNOB AND SHAFT ASSEMBLY

Walter C. Trautman, Bridgeport, Conn., assignor to Casco Products Corporation, Bridgeport, Conn., a corporation of Connecticut Application June 8, 1956, Serial No. 590,133

10 Claims. (Cl. 200—139)

The present invention relates to a knob and shaft assembly and more particularly to an interconnection for fastening a knob to an end portion of a shaft.

It is an object of the invention to provide for the securing of a knob to a shaft, which is economical to fabricate, simple in construction, easily attached to the shaft and in which no tools are required to secure the knob to the shaft or to remove it therefrom whenever desired.

Another object of the present invention is to provide for the positioning of a knob on the end portion of a shaft in which the knob can only be placed on the shaft in one angular position whereby the orientation between the shaft and any index mark on the knob cannot be altered.

A further object of the invention is to provide a knob which is only secured to a shaft by frictional engagement therewith and in which the normally visible exterior surface thereof has no unsightly slots, grooves or threaded apertures.

Another object of the present invention resides in providing a connecting element between a knob and a shaft which can be initially secured to the shaft at any angular position thereof and in which the element may be removed from and then replaced on the shaft at only the initial angular position and in which the placing of the knob on the shaft causes the element to more firmly become secured to the shaft.

A feature of the invention resides in providing a clip in the shape of an angle. The clip preferably has two arms that define therebetween an angle approximating a right angle. One arm has an aperture through which the shaft passes and which may contain orienting and shaft deforming nibs to cause securement to the shaft. The other arm is in one embodiment shaped to provide resilient leg members which extend into a slot formed in the underside of the knob. The normal maximum distance across the legs is slightly larger than the length of the slot whereby the legs are resiliently deformed by the side surfaces of the slot to create frictional engagement between the leg members and the slot in order to hold the knob in place. In another embodiment, the slot in the knob is not exactly aligned with the arm whereby placing the knob on the shaft causes the angle between the two arms of the clip to be changed to create frictional engagement between a wall of the slot and the arm and to cant the other arm on the shaft to cause the latter to more firmly grasp the shaft. It will thus appear that in both embodiments of the invention the knob is held on the shaft by causing a resilient stressing of the clip which creates the necessary retaining force.

Other features and advantages will hereinafter appear.

In the drawings:

Figure 1 is a section of an electric iron in which the knob and shaft assembly of the present invention may be incorporated.

Fig. 2 is an elevation, partly in section, showing the assembly with the shaft used to control an adjustable thermostatic switch.

Fig. 3 is a view taken on a line 3—3 of Fig. 1, showing the relationship existing in one embodiment between the knob and the clip.

Fig. 4 is a view of the bottom of the knob.

Fig. 5 is a section taken on the line 5—5 of Fig. 2.

Fig. 6 is an end elevation of Fig. 5.

Fig. 7 is a side view of another embodiment of the present invention.

Fig. 8 is an end view thereof.

Fig. 9 is a view, partly in section, showing the relationship between the knob, shaft and clip.

Fig. 10 is the view taken on the line 10—10 of Fig. 9.

The knob and shaft assembly is specifically disclosed as applied to a thermastatic switch of an electric iron. In such an iron, which may be either steam, dry or a combination thereof, there is generally provided a manually movable knob for controlling the temperature of the ironing surface and a scale which, by means of an index mark on the knob, gives a visible indication of the temperature setting of the thermostat. Accordingly, the present invention has particular utility, in an electric iron in which the knob can be removed from the shaft and replaced thereon at only one position so that the index mark on the knob and the position of the shaft with respect thereto remains unchanged. Moreover the connecting element, in the assembly of the iron enables a quicker, more economical and more accurate calibration of the thermostat, this resulting in an economy of manufacture.

Referring to the drawing, a steam iron, generally indicated by the reference numeral 10, is shown having a handle 11 and a sole plate 12. A projecting manually movable knob 13 is provided and has on its exterior surface an index mark (not shown) for cooperation with a scale marked on a plate 14. The knob is attached to a thermostatic switch generally indicated by the reference numeral 15 and the mark and seal give a visible indication of the temperature or fabric setting of the thermostatic switch and hence the soleplate.

As shown in Figs. 1 and 2, the switch 15 has a temperature sensitive arm 16 carrying a contact 17. A second contact 18 is carried by a resilient arm 19 fastened to an upper plate member 20 of the switch. In such a construction, as the temperature increases the contact 17 is caused to move away from the contact 18 and conversely, as the temperature decreases, toward, to cause electrical engagement between the contacts.

An adjusting mechanism 21 is provided to vary the temperature at which the contacts will separate to stop heating of the iron. The arm 19 is normally resiliently biased away from the contact 17 and as it is moved by the adjusting mechanism toward the contact 17, the temperature at which the contacts will open can be altered. The adjusting mechanism 21 includes an elongated nut 22 fastened to the upper plate member 20 in alignment with an aperture 23 formed in the plate. A tubular thermostat control shaft 24 has a threaded portion 25 mating with the nut 22. Within the shaft 24 there is positioned a rod 26, an insulating plug 27, and a screw 28. The latter is threaded into a threaded interior portion 29 of the shaft 24 and is used to initially set the thermostat so that it will react at a known temperature and at a known angular position of the shaft 24. The exterior of the shaft 24 carries an arm 30 which engages a stop member 31 fastened on the nut 22 to limit rotation of the shaft.

As shown in Fig. 1, the switch 15 is positioned within an enclosure formed in the iron and the shaft extends through an aperture 32 formed in a housing member 33 of the iron.

To secure the knob 13 to the shaft at the angular position thereof at which the index mark of the knob is oriented with respect to the reaction temperature of the thermostat and the scale on the plate 14, an angle clip 34 is provided. As shown in Figs. 5 and 6, the clip has two arms, 35 and 36, extending at substantially right angles to each other. The arm 35 is provided with an aperture 37, having nibs 38 and upon forcing the clip on the shaft, the nibs form slots 39 on the exterior surface of shaft 24 though if desired the slots 39 may be preformed prior to positioning the clip on the shaft. The clip is thus securely fastened to the shaft 24 for rotation therewith yet may be removed. The arm 36 is shaped to provide legs 40 and 41 and the end portions of these legs are beveled as at 42 with the maximum distance across the legs indicated by the dotted line 43. The clip 34 is preferably formed of spring steel or other resilient material so that the legs may be distorted without deformation thereof.

In assembling the iron, the thermostatic switch is positioned within the housing thereof with the shaft 24 extending through the aperture 32. The shaft 24 is turned so that the arm 30 engages the stop member 31. The clip 34 is then forced onto the shaft 24 with the arm 36 having a preselected angular relationship to the arm 36 such that when the knob is positioned on the shaft, the index mark thereof will indicate on the scale the temperature setting of the thermostat. Since each thermoswitch varies, it is necessary to calibrate the switch and this is done by holding the shaft 24 stationary and adjusting the screw 28 until the reaction temperature of the thermostat is oriented to the position of the shaft 24. The clip provides both a manual graspable means to enable an operator to hold the shaft stationary and also serves to give an indication of the relationship that will exist between the index mark on the knob and the shaft and thus obviates the need of a dummy knob that heretofore was necessary when only a set screw and detent were utilized to hold the knob on the shaft.

Shown in Fig. 4 is the bottom surface of the knob which has a slot 44 having parallel side walls 45 and 46 formed therein. Additionally, a circular hole 47 is provided having its axis parallel with the slot 44 into which the end portion of the shaft fits. The length or the distance between the parallel side walls 45 and 46 of the slot is slightly less than the maximum distance between the outside surfaces of the legs 40 and 41 as indicated by the line 43. Accordingly, when the legs are positioned in the slot, as shown in Fig. 3, this difference in a common dimension is utilized to stress the legs toward each other, thereby creating a frictional force which secures the knob on the shaft.

Referring to Figs. 7 to 10, inclusive, wherein a second embodiment of the present invention is illustrated, a clip 50 is provided with two arms 51 and 52. The arms extend at other than right angles to each other and in this specific embodiment, while they may extend greater than 90 degrees, they are shown as extending at about 80 degrees or slightly less than a right angle. The arm 51 is preferably formed to easily fit within the slot of the knob but if desired or found necessary it may be formed as shown in the prior embodiment with two legs to thereby increase the frictional engagement between the knob and the arm.

Shown in Fig. 9 a knob 53, similar to the knob 13 shown in Figs. 1, 3 and 4 inclusive is provided; however, the entrance to a slot 54 is beveled as at 55 to aid the arm 51 to enter the slot, when the knob is forced onto a shaft 56. From this view, it will be seen that as the arm 51 is moved into the slot 54, the arm 52 is caused to cant or deflect from the radial axis of the shaft 56, which effects a binding therebetween and makes the arm 51 become more securely attached to the shaft. Furthermore, a surface 57 of the arm 51 is caused to bind itself against a wall 58 of the slot to create the necessary friction between the clip and the knob to hold the knob in place.

While the axis of a hole 59 formed in the knob to receive the end of the shaft 56, and the slot 54 may extend at an angle to each other, provided that this angle is slightly different from the angle between the two arms of the clip, in the illustrated embodiment the axis of the hole 59 and the slot 53 are shown extending parallel to each other.

Fig. 10 illustrates the relationship between the arm 52 and the shaft 56 which prevents the clip from being positioned on the shaft in any but the correct oriented position. While this may be accomplished by the use of mating irregular surfaces, as for example, a flat, there is shown a plurality of nibs 60 in which one nib is unequally displaced from its adjacent nibs, such that only in the position shown will the nibs and slots 61 formed in the shaft 56 mate. Moreover, in this embodiment of the invention, the clip may have a sliding fit on the shaft, if desired, enabling ready removal and replacement thereof, without causing the arm 52 to be ineffectual to hold the knob and shaft together.

In both of the illustrated embodiments, the knob is formed completely of moldable plastic material, such as Bakelite. Heretofore, wherein a set screw was employed as the knob securing device it had been necessary to mold into the knob an annular ring of metal to prevent the knob from cracking when the set screw is tightened. The present invention obviates the need for such a ring and thus an economy in manufacture is obtained.

From the foregoing, it will be perceived that the present invention provides for a connecting element to hold a knob on a shaft in which the knob is only frictionally held on the shaft and thus may be readily removed or positioned on the shaft without any tools. The knob is held by friction created by resilient distortion of the clip, either of the leg members or the angle between the arms thereof. In addition thereto, the connecting element prevents replacement of the knob on the shaft in any but the oriented position between the knob and the shaft.

Variations and modifications of the invention may be made within the scope of the claims and portions of the improvements may be used without others.

I claim:

1. A knob and shaft assembly comprising a rotatable shaft; a knob having formed therein a hole and a slot, the axes of which are aligned; a clip interconnecting the knob to the shaft at only one relative position thereof; said clip having two arms extending at slightly less than a right angle to each other; one being formed with an aperture thereon through which the shaft passes; cooperating means on the shaft and arm for preventing relative rotation therebetween; and the other arm extending into the slot whereby the knob effectuates resilient stressing of the clip to cause the one arm of the clip to cant on the shaft creating a more positive engagement therewith and the other arm biased against a wall of the slot to maintain the knob on the shaft.

2. The invention as defined in claim 1 in which the one edge of the entrance to the slot is beveled to aid the other arm to enter the slot.

3. In combination with an electric iron having an enclosure located above the soleplate; an adjustable thermostatic switch disposed in said enclosure; said switch having a rotatable tubular shaft for permitting variation of the temperature at which the thermostatic switch will react and turnable means located inside the shaft for initially setting the switch; said shaft having a portion thereof extending out of the enclosure; and a clip having two arms, one arm being fastened to extending portion of the shaft with the other arm spaced from the shaft, the other arm for providing a manually graspable element to enable preventing relative movement of the shaft when the turnable means are being adjusted.

4. A knob and shaft assembly comprising a rotatable shaft; a knob having formed therein a hole for receiving the end portion of the shaft and a slot; the hole and the slot having entrances located on the same surface of the knob; a connecting element having two arms, one of said arms being fastened with the shaft and the other arm being positioned in the slot for frictional engagement therewith whereby the knob is only frictionally connected to the shaft; and in which the other arm has two leg portions having a maximum distance between the outer edges thereof slightly greater than the length of the slot whereby the walls of the slot create friction between the arm and the knob by resiliently biasing the arms toward each other.

5. A knob and shaft assembly comprising a rotatable shaft; a knob having formed therein a hole for receiving the end portion of the shaft and a slot; the hole and the slot having entrances located on the same surface of the knob; a connecting element having two arms, one of said arms being fastened with the shaft and the other arm being positioned in the slot for frictional engagement therewith whereby the knob is only frictionally connected to the shaft; in which the arms of the clip define therebetween an angle such as to create a relationship between the axis of the shaft and the other arm; and in which the axis of the slot and the axis of the hole have a slightly different relationship whereby the knob tends to cause a variation in the angle between the arms when it is placed on the shaft.

6. A knob and shaft assembly comprising a rotatable shaft; a knob having formed therein a hole for receiving the end portion of the shaft and a slot; the hole and the slot having entrances located on the same surface of the knob; a connecting element having two arms, one of said arms being fastened with the shaft and the other arm being positioned in the slot for frictional engagement therewith whereby the knob is only frictionally connected to the shaft; in which the arms of the clip define therebetween an angle such as to create a relationship between the axis of the shaft and the other arm; in which the axis of the slot and the axis of the hole have a slightly different relationship whereby the knob tends to cause a variation in the angle between the arms when it is placed on the shaft; and in which the axis of the hole and slot are parallel and the angle between the arms is slightly different from a right angle.

7. An adjustable thermostatic switch assembly comprising a first contact; temperature sensitive means on which the contact is mounted for causing movement thereof in response to temperature changes; a second contact; means mounting the second contact and biasing it away from the first; adjusting means in engagement with the mounting means of the second contact for moving the contact toward and away from the first contact; a manually operable member; connecting means having resilient portions for creating friction to secure the adjusting means to the manually operable member and enabling the adjusting means to be positioned on the shaft at only one angular position relative to the shaft; in which the adjusting means includes a threaded rotatable shaft and a nut; in which the manually operable member is a knob having a slot; and in which the resilient portions consist of two legs with the maximum distance between the legs being slightly greater than the length of the slot, whereby the slot compresses the legs toward each other when they are in the slot thereby providing a frictional engagement between the interconnecting means and the knob.

8. An adjustable thermostatic switch assembly comprising a first contact; temperature sensitive means on which the contact is mounted for causing movement thereof in response to temperature changes; a second contact; means mounting the second contact and biasing it away from the first; adjusting means in engagement with the mounting means of the second contact for moving the contact toward and away from the first contact; a manually operable member; connecting means having resilient portions for creating friction to secure the adjusting means to the manually operable member and enabling the adjusting means to be positioned on the shaft at only one angular position relative to the shaft; in which the connecting means comprises a clip having two arms extending at slightly less than a right angle to each other; and in which the knob has a hole for receiving the end of the shaft and slot, the axis of the hole and slot being aligned; whereby the knob, when positioned on the shaft, tends to alter the angle between the arms causing frictional engagement between the shaft and one arm and the knob and the other arm of the clip.

9. In combination with a circular knob having an axial aperture and a slot formed in its bottom surface, and a rotatable shaft having its end portion slidably fitted within the aperture, means for interconnecting the shaft and the knob to secure the knob to the shaft and provide for indexing the knob with respect to the shaft; said means including an angular member having two arms, one arm being fastened to the shaft and the other extending along the shaft for insertion into the slot formed in the bottom of the knob, said slot being dimensioned and positioned to cause a resilient stress of the angular member when the member is positioned within the slot to create frictional engagement with the surface of the slot to maintain the knob on the shaft; and in which the other arm is formed to provide two leg portions; the maximum distance between the outside of the leg portions being slightly more than the length of the slot whereby the leg portions are caused to be resiliently moved toward each other by the sides of the slot in the knob.

10. In combination with a circular knob having an axial aperture and a slot formed in its bottom surface, and a rotatable shaft having its end portion slidably fitted within the aperture, means for interconnecting the shaft and the knob to secure the knob to the shaft and provide for indexing the knob with respect to the shaft; said means including an angular member having two arms, one arm being fastened to the shaft and the other extending along the shaft for insertion into the slot formed in the bottom of the knob, said slot being dimensioned and positioned to cause a resilient stress of the angular member when the member is positioned within the slot to create frictional engagement with the surface of the slot to maintain the knob on the shaft; in which the axis of the aperture and the slot are parallel; and in which the angle between the arms is slightly different than a right angle whereby the knob when positioned on the shaft causes a change in the angle between the arms thereby effectuating a canting of the one arm on the shaft and a biasing of the other arm into frictional engagement with a surface defining the slot.

References Cited in the file of this patent

UNITED STATES PATENTS

| | | |
|---|---|---|
| 2,299,462 | Clark et al. | Oct. 20, 1942 |
| 2,370,146 | Clark | Feb. 27, 1945 |
| 2,681,406 | Youhouse | June 15, 1954 |